United States Patent Office 3,165,559
Patented Jan. 12, 1965

3,165,559
MANUFACTURE OF BEAD POLYMERS
Karl-Heinz Kahrs, Frankfurt am Main, Fritz Winkler, Kelkheim, Taunus, and Johann Wolfgang Zimmermann, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 1, 1959, Ser. No. 856,338
Claims priority, application Germany Dec. 13, 1958
12 Claims. (Cl. 260—875)

The present invention relates to a process for the manufacture of bead polymers.

It has already been proposed to prepare graft polymers of polymerizable compounds, especially of vinyl esters on polyalkylene oxides or polyalkylene glycols, by dissolving said polyalkylene oxides or polyalkylene glycols in the monomer and subsequently carrying out the polymerization with the aid of free radical forming activators in the homogeneous phase, for example as bulk polymerization, in continuous or discontinuous manner, whereby modified polyvinyl esters having novel technologically interesting properties are obtained. Polymerization in the homogeneous phase is, however, beset with some disadvantages. The products obtained by discontinuous bulk polymerization must be comminuted in special machines in order to be converted into small readily processable particles. Continuous bulk polymerization only enables the manufacture of products having a relatively low degree of polymerization and, therefore, a relatively low softening point since otherwise it would not be possible to continuously remove the product from the reaction vessel. Polymers produced in solution also exhibit a relatively low degree of polymerization.

Owing to these difficulties, polymers or copolymers of a high degree of polymerization have been prepared heretofore by bead polymerization, that is to say the monomer or mixture of monomers which contains a dissolved activator and is suspended in water including an appropriate emulsifier is so polymerized that the polymer is obtained in the form of small balls or beads which can readily be isolated and processed and have molecular weights substantially higher than the products obtained by bulk polymerization.

We have now found that bead-like graft polymers can be obtained by polymerizing a vinyl ester in an aqueous medium in the presence of conventional polymerization activators and in the presence of an appropriate emulsifier, while stirring vigorously, with a polyalkylene glycol or a derivative thereof which is soluble in the vinyl esters used but insoluble in water. This is an unexpected result in view of the fact that the mechanism of bead polymerization would not suggest that a graft reaction between vinyl esters and polyalkylene glycols takes place in the presence of water.

As monomers which are suitable for use in the bead polymerization process according to this invention, there may be mentioned vinyl esters of monobasic carboxylic acids containing 2-10, preferably 2-4 carbon atoms, such as vinyl acetate, vinyl propionate, vinyl butyrate or vinyl benzoate. Mixtures of the aforementioned vinyl esters may also be polymerized according to the process of the invention. Furthermore there may be polymerized mixtures consisting at least of 50% by weight of the aforementioned vinyl esters and esters of acrylic acid or methacrylic acid with lower monovalent aliphatic saturated alcohols containing from 1-8 carbon atoms, for example methanol, ethanol, n-propanol or isopropanol, the various isomeric butanols, ethyl hexanol, and esters of maleic acid or fumaric acid or itaconic acid with aliphatic monovalent saturated alcohols with up to 4 carbon atoms, such as maleic acid dimethylester, fumaric acid dibutylester or itaconic acid dimethylester and crotonic acid.

As polyalkylene glycols there may be used water-insoluble polypropylene glycols having a molecular weight within the range of about 1,000–10,000, preferably 1,000–4,000.

There may also be used polyalkylene glycols obtained from the higher homologs of propylene oxide, such as epoxy butane or isobutylene oxide, and copolymers and terpolymers obtained by polymerization of at least two of the aforementioned alkylene oxides; furthermore, there may be used products obtained by reacting the aforesaid polyalkylene glycols with a quantity of ethylene oxide such that the resulting products are water-insoluble. These chemical reactions lead to the formation of "branched" graft polymers and "bulk" graft polymers which have been defined, for example, by H. Mark in Ang. Chemie 65, pages 53–56 (1955) and in Textile Res. Journal 23, page 294 (1953).

As derivatives of polyalkylene glycols which are suitable for use in the process of this invention, there may be mentioned those of which the terminal hydroxylic groups are etherified at one or both ends with monofunctional or polyfunctional compounds, for example methanol or butanol, or are esterified, for example, with acetic acid, propionic acid or butyric acid. There may also be used polyalkylene oxides containing nitrogen or more especially:

(1) Water-insoluble compounds of which the terminal hydroxyl groups are substituted at one or at either end of the chain with a monofunctional or polyfunctional amine, for example compounds of the formula:

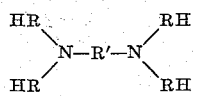

wherein R represents an alkylene oxide chain, except ethylene oxide, containing 15–1,500 members which may consist of the same alkylene oxide, for example propylene oxide or its higher homologs, or of copolymers of different alkylene oxides in either statistic distribution or in the arrangement of alternate blocks. As far as water-insolubility is ensured, the alkylene oxide copolymers may contain a certain proportion of ethylene oxide which, generally, should not exceed 10% by weight calculated upon the total mixture. In the above formula, R' represents a bivalent hydrocarbon radical, for example alkylene radicals containing 2 to 10, preferably 2–6, carbon atoms in a straight or branched chain, arylene or a corresponding mixed aromatic-aliphatic radical, such as phenylene, naphthylene radicals or radicals of the formulae

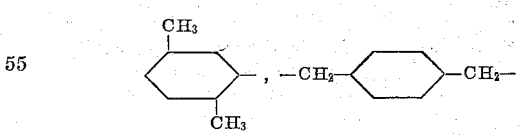

(2) Water-insoluble polyalkylene glycols of which the terminal hydroxyl groups are substituted at one or at either end of the chain by monofunctional or polyfunctional carboxylic acid amides or sulfonic acid amides, for example compounds of the type

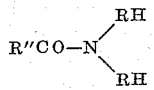

or

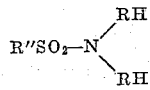

wherein R" represents a monovalent radical of an aliphatic, aromatic or araliphatic hydrocarbon, for example an alkyl radical with 1 to 20 carbon atoms, a phenyl- or naphthyl radical and wherein R has the meaning given above.

The nitrogen containing polyalkyl glycols specified under items (1) and (2) above may also have a structure such that the two terminal hydroxyl groups of the polyalkylene glycol portion are substituted by two different substituents of the type described or with only one nitrogen-containing radical and with one of the ether or carboxylic acid radicals specified above.

In the case of polyfunctional nitrogen-containing substituents, for example diamines, such as ethylene diamine, propoylene diamine, butylene diamine or hexamethylene diamine, or in the case of dicarboxylic acid amides, for example malonic acid diamide, some or all of the substitutable hydrogen atoms may be substituted by the same or different polyalkylene glycol radicals both as regards the type of polyalkylene glycol used and its degree of polymerization, provided that the compounds obtained by such substitution are insoluble in water.

The aforesaid nitrogen-containing polyalkylene oxides have a molecular weight within the range of about 1,500 to 100,000, preferably 1,500 to 20,000.

It is generally advantageous to use the polyalkylene glycols or a suitable derivative thereof in an amount of about 0.1–25% by weight, preferably 0.1–15% by weight, calculated upon the vinyl monomer or mixture of monomers.

The activators used are the conventional free radical forming organic compounds which are advantageously soluble in the organic medium, for example diacetyl peroxide, dibenzoyl peroxide, dilauryl peroxide or $\alpha,\alpha$-azodiisobutyronitrile, which are used in a proportion of 0.01% to about 10%, preferably 0.1–2%, calculated on the weight of the monomers used. The polymerization may also be activated by redox catalysis, for example by using a system comprising dibenzoyl peroxide/benzoin and/or by radiation.

The bead polymerization process according to this invention may be carried out in the presence of a conventional ionic or non-ionic emulsifier (acting as a suspending agent), for example polyvinyl alcohol and copolymers of styrene and maleic acid anhydride. It is especially advantageous to use a water-soluble polyethylene glycol having a molecular weight of about 4,000 to 100,000, preferably 4,000 to 25,000. As emulsifier there may also be used ethoxylated water-soluble polypropylene glycols and hydroxyalkylated polyvinyl alcohols obtained, for example, by saponifying the polymer prepared as described in Example 1 below, since these products and the water-insoluble or difficultly water-soluble polyalkylene oxides or polyalkylene glycols which serve as graft component are naturally related compounds that do not so rapidly impair the polymer or the products obtained therefrom as would foreign emulsifiers which might lead to turbid products due to different solubility, for example. As compared with pure vinyl ester polymers the clear colorless graft polymers obtained by the process of this invention are distinguished by a reduced brittleness and an increased capacity to absorb water.

The amount of emulsifier dissolved in water generally varies between about 0.1% and 5%, preferably 0.1% and 1%, calculated upon the total weight of polyalkylene glycol and monomer.

The temperatures at which the reaction is carried out depend on the monomer and activator system used. The process is generally carried out at a temperature in the range of 20–100° C., advantageously 50–80° C. The process may also be carried out at temperatures above 200° C. under superatmospheric pressure. The process may also be carried out under reduced pressure. It may be advantageous to carry out the polymerization in an inert atmosphere, especially under nitrogen or carbon dioxide. The proportion by weight of water to the solutions of polyalkylene oxides or polyalkylene glycols and monomers should not fall below 1:2.

The above process enables a series of substances having interesting properties to be obtained. The graft polymers obtained can be used as raw materials for making lacquers and adhesives, for cosmetic purposes and the like.

The following examples serve to illustrate the invention, but they are not intended to limit it thereto, the parts being by weight unless otherwise stated:

*Example 1*

A 6 liter four neck flask provided with a stirrer, a dropping funnel, a thermometer and a reflux condenser was charged with 1,000 parts water containing 5 parts of a water-soluble graft polymer of polyethylene oxide on polypropylene oxide as the emulsifier and the whole was heated to 66° C. by means of a water bath. 1,000 parts vinyl acetate containing dissolved therein 50 parts of a water-insoluble polypropylene glycol (molecular weight: about 2,000) and 5 parts dissolved dibenzoylperoxide were then introduced under nitrogen within 90 minutes to 2 hours while stirring well (stirring velocity: 150–200 revolutions per minute). Polymerization was terminated within 30 minutes to 60 minutes. Residues of unreacted vinyl acetate were expelled by means of water vapor. Oval shaped beads or flakes containing about 15% water which were dried at 30–40° C. were obtained. The graft polymer of the beads, and produced by graft polymerization of vinyl acetate and the water-insoluble polypropylene glycol, had a K-value of 60 (see Fikentscher, Cellulosechemie (1932), vol. 13, page 58).

The product was soluble in all solvents usually used to dissolve polyvinyl acetate, with the exception of carbon tetrachloride.

*Example 2*

An apparatus as used in Example 1 was charged with 1,500 parts water containing 11.25 parts of a dissolved water-soluble graft polymer of polyethylene oxide on polypropylene glycol 2000 (molecular weight: about 4,500) and the whole was heated to 66° C. by means of a water bath. A solution of 150 parts of a water-insoluble polypropylene glycol (molecular weight: 3,000), in 1455 parts of vinyl acetate, and containing 45 parts maleic acid diethyl ester and 7.5 parts dibenzoylperoxide was then introduced within 2 hours, while stirring (stirring velocity: 250 revolutions per minute). Stirring was continued for 90 minutes at 80° C. water bath temperature and unreacted vinyl acetate was expelled by means of water vapor.

Oval shaped beads were obtained. They were repeatedly washed with water and dried at 40° C. They dissolved in alcohols, ethyl acetate, and benzene to give a clear solution. The graft polymer of the beads, produced by graft polymerization of vinyl acetate and maleic acid diethyl ester with the water-insoluble polypropylene glycol, had a K-value of 58.

*Example 3*

An apparatus as used in Example 1 was charged with 1,000 parts water containing 10 parts dissolved polyethylene glycol (molecular weight: about 25,000) and the whole was heated to 66° C. Subsequently, a solution composed of 895 parts vinyl acetate,
5 parts $\alpha,\alpha$-azodiisobutyronitrile, and
100 parts ethylene diamine of which the reactive hydrogen atoms were replaced by polypropylene glycol having a mean molecular weight of 1,000, so that the compound itself had a molecular weight of about 4,000 was then added dropwise within 2 hours. The reaction was allowed to continue for 1 hour and the temperature was finally raised to 95° C. Unreacted vinyl acetate was removed by distillation. Slightly yellowish colored oval shaped beads were obtained. The graft polymer of the beads, produced by graft polymerization of vinyl acetate with the polyoxypropylated ethylene diamine, had a K-value of 52.

We claim:
1. In a process for manufacturing bead polymers, the step which comprises graft co-polymerizing, in an aqueous medium, with stirring, at a temperature of from 20° C. to 100° C., and in the presence of a water-soluble emulsifier and of a free radical forming activator, (1) a vinyl ester of a monobasic carboxylic acid having 2-10 carbon atoms and (2), dissolved in said vinyl ester, 0.1–25 percent by weight of said ester of a water-insoluble stem polymer selected from the group consisting of
 (a) polyalkylene glycols
 (b) polyalkylene glycols having at least one etherified terminal hydroxy group
 (c) polyalkylene glycols having at least one esterified terminal hydroxy group
 (d) a compound of the formula

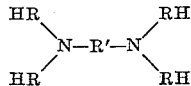

(e) a compound of the formula

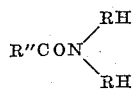

(f) a compound of the formula

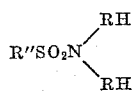

where R' is a bivalent hydrocarbon radical,
R" is a monovalent hydrocarbon radical having up to 20 carbon atoms, and
R is an alkylene oxide chain having 15 to 1500 alkylene oxide units and comprising less than 10 percent by weight of ethylene oxide, said polyalkylene glycols in (a), (b), and (c) having a molecular weight between about 1000 and 10,000, and said compounds (d), (e), and (f) having a molecular weight between about 1500 to 100,000, said water-soluble emulsifier being present in an amount of from about 0.1–5 percent by weight of said water-insoluble stem-polymer and said vinyl ester, and said activator being present in an amount of from 0.01–10 percent by weight of said vinyl ester.

2. The process as claimed in claim 1, wherein the free radical forming activator is a member selected from the group consisting of diacetyl peroxide, dibenzoyl peroxide, dilauroyl peroxide and α,α-azodiisobutyronitrile.

3. The process as claimed in claim 1, wherein the activator is a free radical forming redox system.

4. The process as claimed in claim 1, wherein said water-insoluble stem polymer is a polypropylene glycol with a molecular weight within the range of 1,000–10,000.

5. The process as claimed in claim 1, wherein said water-insoluble stem polymer is a copolymer of at least two members of the group consisting of propylene oxide, 1,2-epoxy-butane and isobutylene oxide.

6. The process as claimed in claim 1, wherein said water-insoluble stem polymer is a polyalkylene glycol with etherified terminal hydroxyl groups.

7. The process as claimed in claim 1, wherein said water-insoluble stem polymer is a polyalkylene glycol with esterified terminal hydroxyl groups.

8. The process as claimed in claim 1, wherein said water-insoluble stem polymer is a product of the general formula

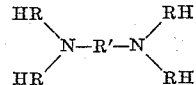

wherein R stands for an alkylene oxide chain with 15 to 1500 alkylene oxide units and comprising less than 10 percent by weight of ethylene oxide, and wherein R' stands for a bivalent hydrocarbon radical.

9. The process as claimed in claim 1, wherein said water-insoluble stem polymer is a product of the general formula

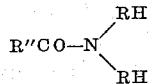

wherein R stands for an alkylene oxide chain with 15 to 1500 alkylene oxide units and comprising less than 10 percent by weight of the ethylene oxide, and R" stands for a monovalent hydrocarbon radical with up to 20 carbon atoms.

10. The process as claimed in claim 1, wherein said water-insoluble stem polymer is a product of the general formula

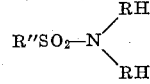

wherein R stands for an alkylene oxide chain with 15 to 1500 alkylene oxide units and comprising less than 10 percent by weight of ethylene oxide, and R" stands for a monovalent hydrocarbon radical with up to 20 carbon atoms.

11. The process as claimed in claim 1, wherein said water-soluble emulsifier is a water-soluble polyethylene glycol with a molecular weight within the range of 4,000 to 100,000.

12. A method according to claim 1, wherein a monomeric member of the group consisting of acrylic acid and methacrylic acid esters of aliphatic monovalent saturated alcohols having 1–8 carbon atoms, maleic, fumaric, and itaconic acid esters of aliphatic monovalent saturated alcohols having 1–4 carbon atoms, and crotonic acid, is additionally present admixed with said vinyl ester, the amount of water-insoluble stem polymer (a)–(f) and of activator being then based on the combined weight of said vinyl ester and said monomeric member, and the amount of emulsifier being then based on the total weight of said vinyl ester, monomeric member, and water-insoluble stem polymer.

References Cited in the file of this patent
UNITED STATES PATENTS

| 2,580,277 | Boyd et al. | Dec. 25, 1951 |
| 2,806,844 | Gerecht et al. | Sept. 17, 1956 |
| 2,956,973 | Holdsworth | Oct. 18, 1960 |
| 3,030,326 | Goldberg et al. | Apr. 17, 1962 |